(12) United States Patent
Oki et al.

(10) Patent No.: US 9,146,365 B1
(45) Date of Patent: Sep. 29, 2015

(54) OPTICAL TRANSCEIVER INSTALLING MT FERRULE TO MATE WITH MPO CONNECTOR

(71) Applicant: Sumitomo Electric Industries, Ltd., Osaka (JP)

(72) Inventors: Kazushige Oki, Yokohama (JP); Takashi Matsui, Yokohama (JP); Kuniyuki Ishii, Yokohama (JP); Hideaki Kamisugi, Yokohama (JP); Hiromi Kurashima, Yokohama (JP); Jignesh Shah, San Jose, CA (US); Lin Zhang, San Jose, CA (US)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/250,007

(22) Filed: Apr. 10, 2014

(51) Int. Cl.
  *G02B 6/36* (2006.01)
  *G02B 6/40* (2006.01)
  *G02B 6/42* (2006.01)

(52) U.S. Cl.
  CPC .............. *G02B 6/403* (2013.01); *G02B 6/4292* (2013.01); *G02B 6/4201* (2013.01); *G02B 6/4246* (2013.01)

(58) Field of Classification Search
  None
  See application file for complete search history.

(56) References Cited

U.S. PATENT DOCUMENTS

| 6,767,141 B1* | 7/2004 | Dudek et al. ............... 385/92 |
| 2003/0156796 A1* | 8/2003 | Rathnam et al. ............ 385/55 |
| 2011/0081119 A1* | 4/2011 | Togami et al. .............. 385/89 |

FOREIGN PATENT DOCUMENTS

JP          10-123366          5/1998

* cited by examiner

*Primary Examiner* — Ryan Lepisto
*Assistant Examiner* — Erin Chiem
(74) *Attorney, Agent, or Firm* — Venable LLP; Michael A. Sartori; Trent B. Ostler

(57) ABSTRACT

A pluggable optical transceiver with the CFP type and the MT ferrule is disclosed. The optical transceiver provides in a rear of the optical receptacle a mechanism to push frontward the MT ferrule set in the optical receptacle and to shield the inside of the optical transceiver. Inner fibers connecting the MT ferrule with another MT ferrule assembled with optical devices pass the mechanism, which may be a metal plate with the elastic function and/or a coil spring combined with a holder to hold the MT ferrule.

9 Claims, 14 Drawing Sheets

OPTICAL TRANSCEIVER INSTALLING MT FERRULE TO MATE WITH MPO CONNECTOR

BACKGROUND OF THE INVENTION

1. Field of the Invention

The present application relates to an optical transceiver, in particular, the present application relates to an optical transceiver that provides an MT ferrule to be mated with an external MPO (Multiple-fiber Push-ON) connector.

2. Background Arts

MPO connectors have been well known in the field of optical communication. A Japanese Patent Application laid open No. H10-123366A has disclosed an inner configuration of an MPO connector. The MPO connector connects fibers in one side with fibers in other sides; that is, the MPO connector optically couples a plurality of fibers collectively.

On the other hand, one type of multi-source agreements (MSA) has defined details of a pluggable optical transceiver called as Centum (100) gigabit From-factor Pluggable (hereafter denoted as CFP). The CFP transceiver in an original specification thereof provides an optical receptacle types of, what is called, the LC connector, the SC connector, and so on.

Recently, as the transmission speed of the optical communication system increases, where the speed reaches and sometimes exceeds 25 Gbps, the electro-magnetic interference (EMI) radiation becomes further important subject. As the transmission speed increase, namely, the frequency of the signals increases, which means the wavelength of the signals become shorter, the EMI noises with higher frequencies easily leak from gaps and/or spaces with smaller dimensions left in the housing of the optical transceiver. Moreover, an optical transceiver has been applied from the field of the trunk line and the subscriber lines to the field of the data center where data in many channels are sent in parallel and collectively. Accordingly, recent optical transceivers are requested to install an optical connector that secures many transmission fibers, typically, an MT connector. The present application is to provide an optical transceiver that installs the MT connector and lowers the EMI noises.

SUMMARY OF THE INVENTION

An aspect of the present application relates to an optical transceiver that comprises an optical assembly, and optical receptacle, an inner fiber, a housing, and a mechanism not only to secure an optical coupling between the optical receptacle with an external optical connector but to shield an inside of the optical transceiver reliably. The optical assembly includes an optical device. The optical receptacle couples with an external fiber through an MPO connector by receiving the MPO connector. The inner fiber couples with the optical assembly by an MT ferrule also with the optical receptacle by another MT ferrule. That is, the inner fiber provides MT ferrules in both ends thereof to couple optically with the optical assembly and the optical receptacle. The housing installs the optical assembly, the optical receptacle, the inner fiber, and the mechanism. A feature of the present application is that the mechanism pushes another MT ferrule toward the optical receptacle without degrading the EMI tolerance.

The mechanism may be a plate, typically made of metal, set behind the optical receptacle and has a U-shape cross section. Inserting the plate into a pocket provided in the housing, the plate pushes another MT ferrule against the optical receptacle so that the other end of the plate contact to the housing.

Another arrangement of the mechanism may be a combination of a holder and a spring, and a hollow provided in the housing to set the combination therein. The holder, which is typically made of metal, holds a rear portion of another MT ferrule, while, the spring is set between the holder and the rear wall of the hollow to push another MT ferrule against the optical receptacle via the holder. The spring may be a coil spring. The inner fiber extending from the rear of another MT ferrule pierces the holder, passes inside of the coil spring and the cut formed in a wall constituting the hollow.

Thus, the mechanism has the enhancement of the reliability of the optical coupling with the external connector, even the external connector is an MPO connector with an MT ferrule, to be consistent with the EMI tolerance.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments according to the present application will be described as referring to drawings. In the description of the drawings, numerals or symbols same or similar to each other will refer to elements same or similar to each other without duplicated explanations.

First Embodiment

Figure 1:
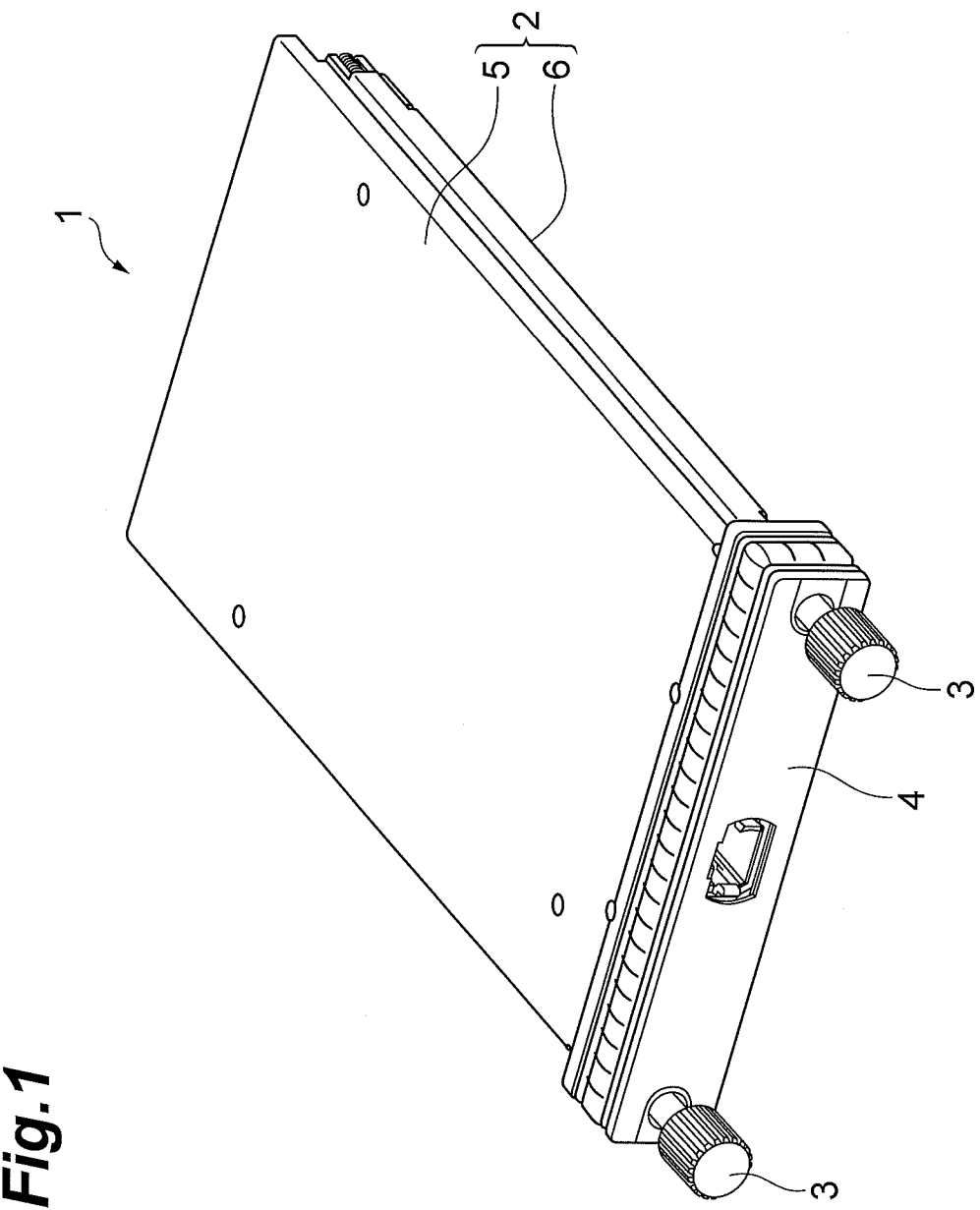
FIG. 1 is an outer appearance of an optical transceiver according to an embodiment of the present application.

An optical transceiver 1 of the present application, as illustrated in FIG. 1, has a type of, what is called, the CFP following one of multi-source agreements (MSA) relating to optical transceivers. The optical transceiver 1, which is primarily installed in a data center, outputs and receives a plurality of optical signals via a plurality of optical fibers whose lengths are several hundred meters at most. The optical transceiver 1 implements with a plurality of vertical cavity surface emitting laser diodes (hereafter denoted as VCSEL) each emitting an optical signal with a wavelength shorter than one (1) micron as optical signal sources. The optical transceiver 1 comprises a housing 2, two screws 3, and a front cover 4. The housing 2 includes a top body 5 and a bottom body 6.

Figure 2:
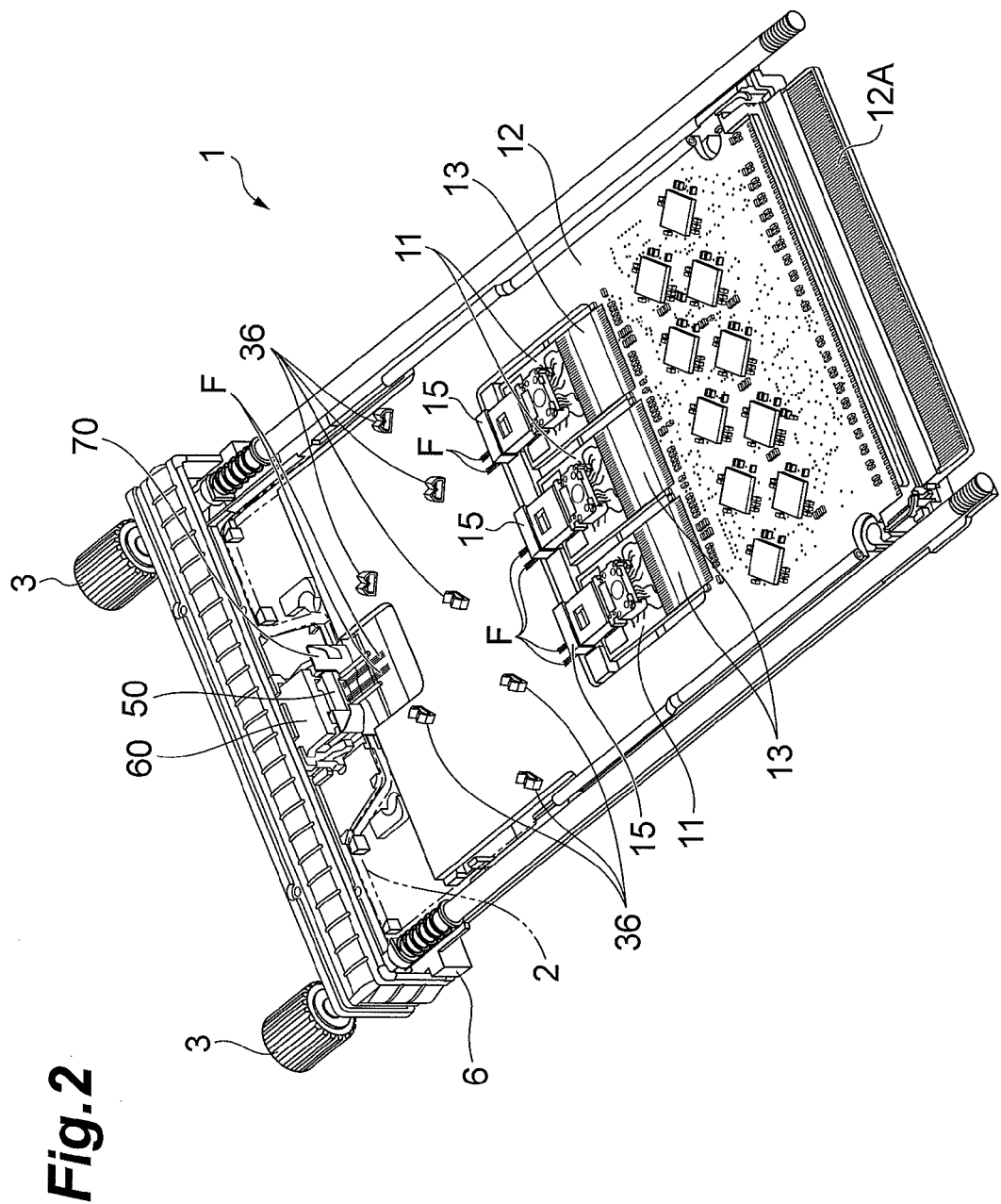
FIG. 2 is a perspective view of an inside of the optical transceiver.

FIG. 2 is a perspective view of an inside of the optical transceiver 1. As shown in FIG. 2, the optical transceiver 1 encloses between two bodies, 5 and 6, three sub-boards 11 and a circuit board 12. The sub-boards 11 are electrically connected to the circuit board 12 with respective flexible printed circuit boards (hereafter denoted as FPC) 13. Each of the sub-boards 11 mounts optical devices; while, the circuit board 12 mounts an electronic circuit to drive the optical devices and control the whole of the optical transceiver 1. The circuit board 12 provides an electrical plug 12A in a rear end thereof to communicate with the host system and to be provided with power supplies from the host system. The description below assumes the directions of "front", "rear", "top" and "bottom" merely for the explanation sake. A side where the front cover 4 is provided is the front; while, another side where the electrical plug 12A is provided is the rear. Also, a side where the top body 5 is provided is the top; while, the other side where the bottom body 6 is provided is the bottom. These directions are only for the explanation sake, and do not restrict a scope of the present invention.

Figure 3:
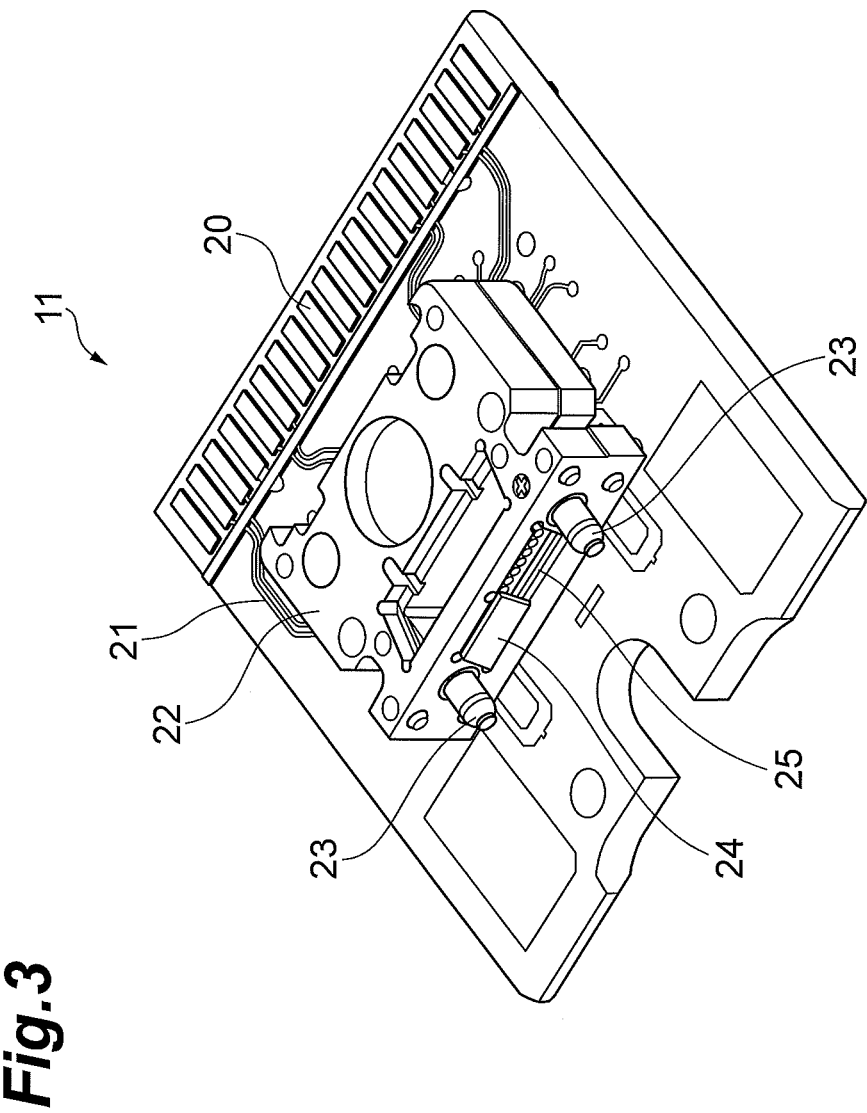
FIG. 3 is a perspective view of a sub-board that mounts optical assemblies thereon.
Figure 4:
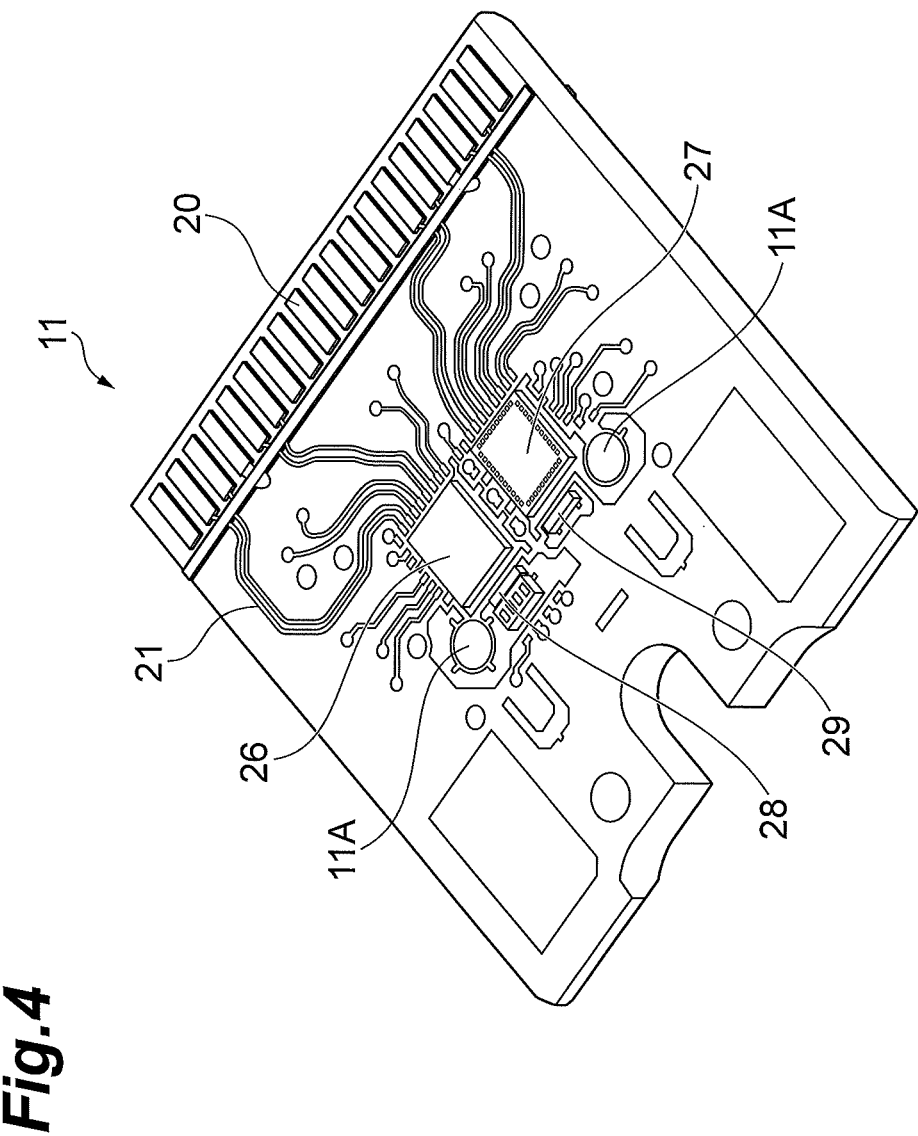
FIG. 4 is also a perspective view of the sub-board shown in FIG. 3 but lens assembly appearing in FIG. 3 is removed.

Each of sub-boards 11 may be made of, what is called, FR-4 (Flame Retardant Type 4). As shown in FIG. 3, the sub-board 11 provides electrodes 20, interconnections 21, and a lens assembly 22 including two guide pins 23, a Tx port 24, and an Rx port 25. FIG. 4 removes a shell of the lens assembly 22 to show optical devices, 28 and 29, and electrical devices, 26 and 27. Specifically, the arrayed VCSEL 28 integrates four active elements each driven by the driver 26; while, an arrayed photodiode (hereafter denoted as arrayed PD) 29 also integrates four active elements.

The interconnections 21 are formed on a surface of the sub-board 11. A portion of the interconnection 21 mounts the arrayed VCSEL 28 thereon. Each of device elements integrated in the arrayed VCSEL 28 is independently driven by the driver 26. While, the pre-amplifier 27 independently amplifies each of photocurrents generated by respective PD elements in the arrayed PD 29. Those devices of the driver 26, the pre-amplifier 27, the arrayed VCSEL 28 and the arrayed PD 29 are electrically connected mutually and to the interconnections 21 by bonding wires. Metal ribbons may be replaced with the bonding wires. Also, the flip-chip bonding and so on without using any bonding wires and ribbons are applicable to the present embodiment.

The sub-board 11 may also provide alignment marks formed concurrently with the interconnection 21 by a material same with the interconnection 21. The alignment mark facilitates the mounting of the arrange VCSEL 28 and the arrayed PD 29 on the sub-board 11. An adhesive and conductive resin may fix the optical devices, 28 and 29, to the surface of the sub-board 11. After the mount of the optical devices, 28 and 29, on the surface of the sub-board 11 and the electrical connection to the interconnections 21, a lens assembly 22 shown in FIG. 3, which may be made of resin transparent to light subject to the optical devices, 28 and 29, typically those named as ULTEM™, covers the optical devices, 28 and 29, and is mounted on the sub-board 11.

The lens assembly 22 integrates on a surface thereof a plurality of lenses each corresponding to respective active element in the arrayed VCSEL 28 and those in the arrayed PD 29. Optical beams generated by respective elements in the arrayed VCSEL 28 enter the lens assembly 22 via first lenses, which are collimating lenses. The optical beams entering the lens assembly 22 are internally reflected toward the Tx port 24 at a surface with an angle of 45° with respect to the primary surface of the sub-board 11. Second lenses, concentrating lenses, are provided between the reflecting surface and the Tx port 24 to concentrate the optical beams onto the ends of the internal fiber F.

The guide pin 23 guides an MT ferrule 15. Specifically, the guide pins 23 provided in respective sides of the front surface of the lens assembly 22 are inserted into bores provided in the MT ferrule 15 such that the inner fibers F secured in the MT ferrule 15 align with the lenses provided within the front hollow of the lens assembly 22. Also, the alignment of the lens assembly 22 with the optical devices, 28 and 29, mounted on the surface of the sub-board 11 is performed by mating pins provided in the bottom surface of the lens assembly 22 into the holes 11A provided in immediate sides of the optical devices, 28 and 29. Or, the optical alignment between the lens assembly 22 and the optical devices, 28 and 29, may be carried out by mating a temporal MT ferrule with the guide pins 23 and practically activating the optical devices, 28 and 29, such that the optical beams detected via the optical fibers secured in the temporal MT ferrule become optimum. After the optical alignment between the lens assembly 22 and the optical devices, 28 and 29, on the sub-board 11, the lens assembly 22 is permanently fixed to the sub-board 11 by, for instance, epoxy resin.

Figure 5:
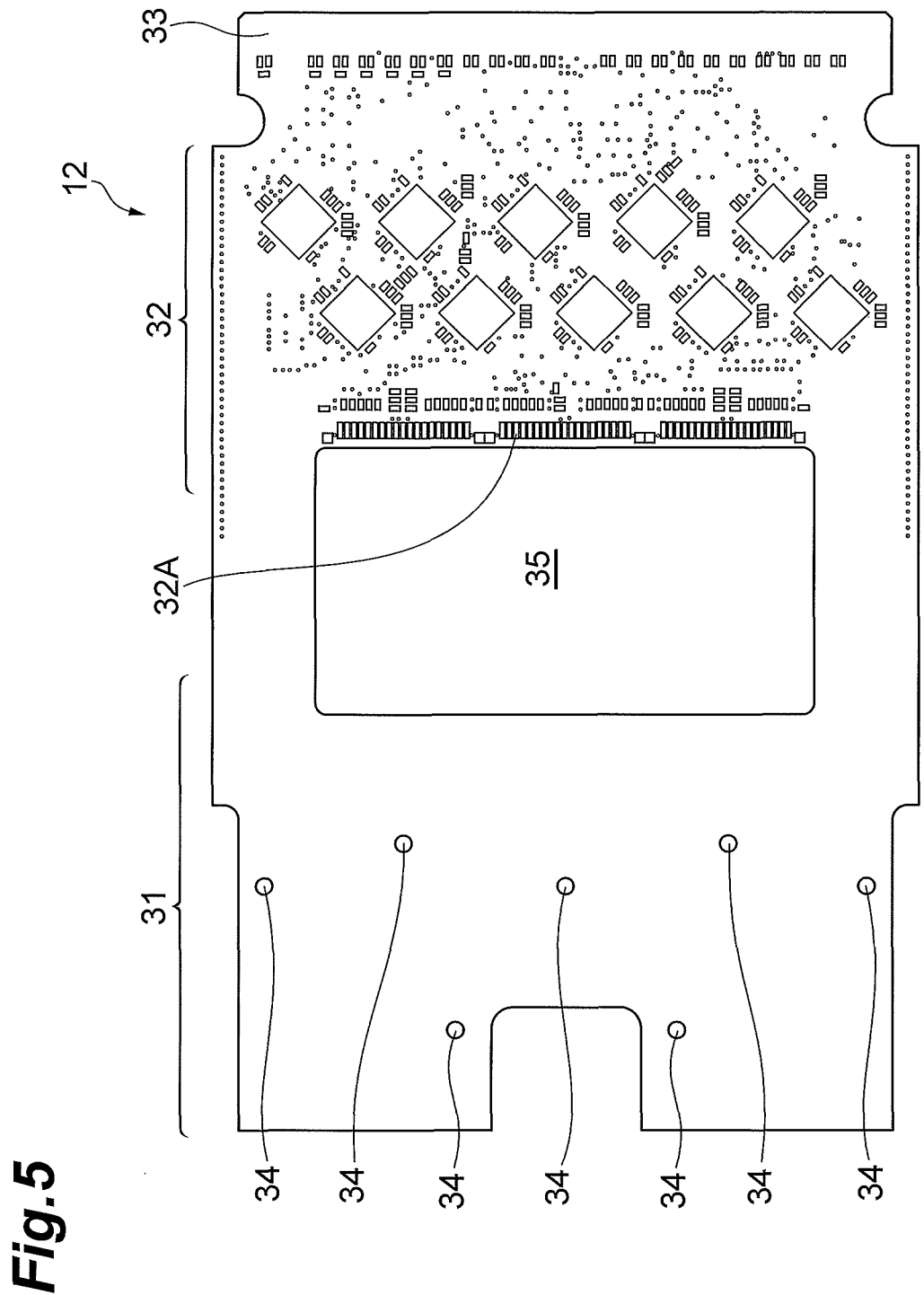
FIG. 5 is a plan view of a circuit board.

FIG. 5 is a plan view of the circuit board 12. The circuit board 12 includes three portions, 31 to 33, namely, the fiber disposing region 31, the circuit region 32, and the plug region 33. The circuit board 12 further provides holes 34 for fastening clips to fasten the fiber thereby and an opening 35 into which the sub-boards 11 are set. The opening 35 is provided between the fiber disposing region 31 and the circuit region 32.

The fiber disposing region 31 sets the inner fibers F therein; while, the circuit region 32 mounts circuit components on the top and back surfaces of the circuit board 12. The circuit region in the front end thereof facing the opening 35 provides a plurality of electronic pads 32A for the FPC board 13 connecting the circuit board 12 with the sub-board 11. The plug region 33 in the rear end of the circuit board 12 provides electronic plugs 12A also in the top and back surfaces, where FIG. 5 removes the plugs explicitly.

The inner fibers F are arranged in the fiver disposing region 31 so as to secure the bending curvature larger than 15 mm. Clips set in the holes 34 may assist the arrangement of the inner fiber F in the fiber disposing region 31 by fastening them.

Figure 6:
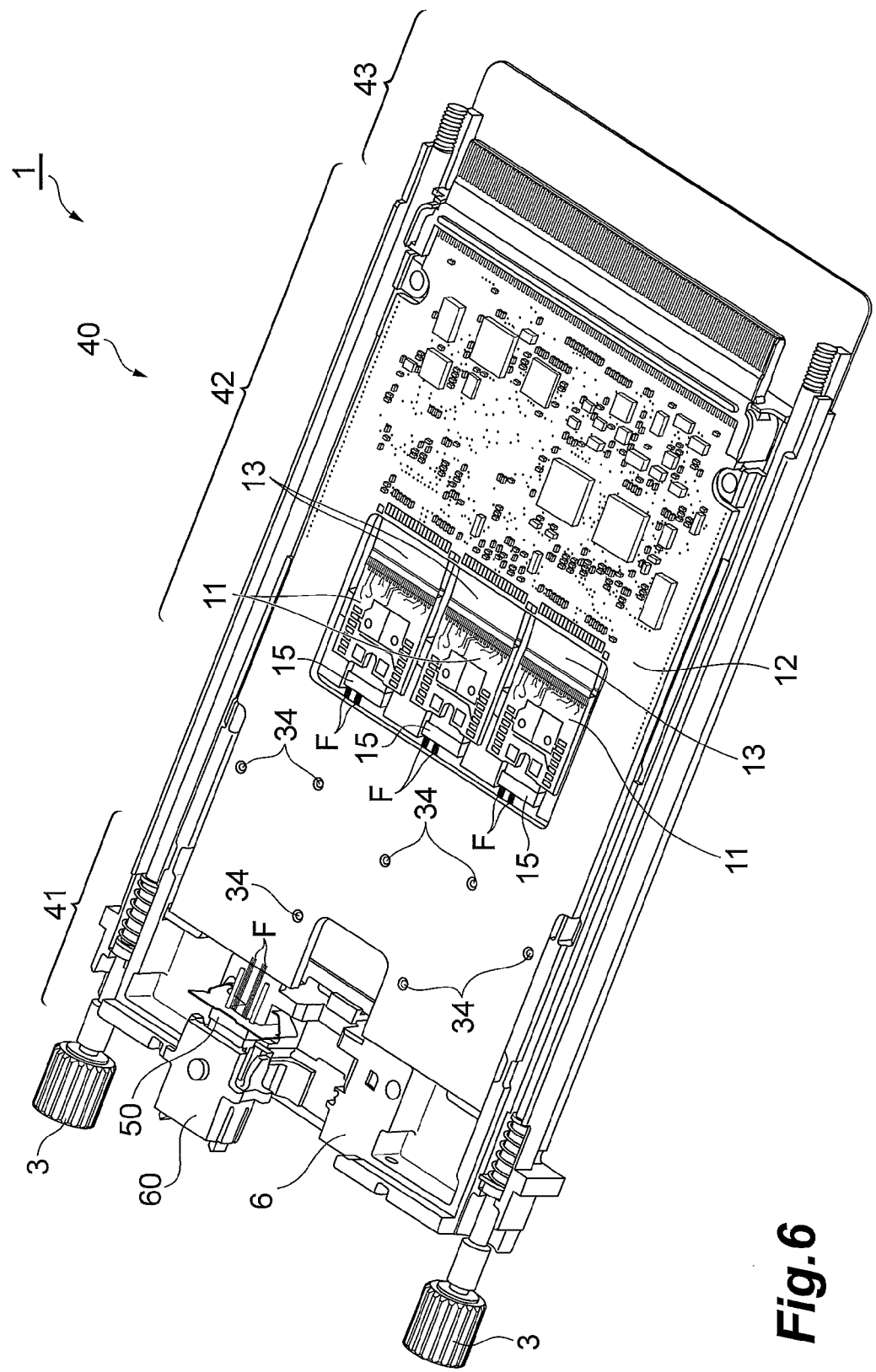
FIG. 6 is a perspective view of the inside of the optical transceiver, where the circuit board shown in FIG. 5 mounts electronic circuits and sub-boards thereon.

FIG. 6 is a perspective view showing an inside of the optical transceiver 1, where the top body 5 is removed to show the inside. The space 40 formed between the top and bottom bodies, 5 and 6, are roughly divided into three portions, 41 to 43, namely, a receptacle portion 41, an active portion 42, and a fitting portion 43. The receptacle portion 41 provides in the bottom body 6 thereof an optical receptacle 60 that receives an external MPO connector (Multiple-fiber Push-ON) and is made of resin, typically, ULTEM™.

Figure 7:
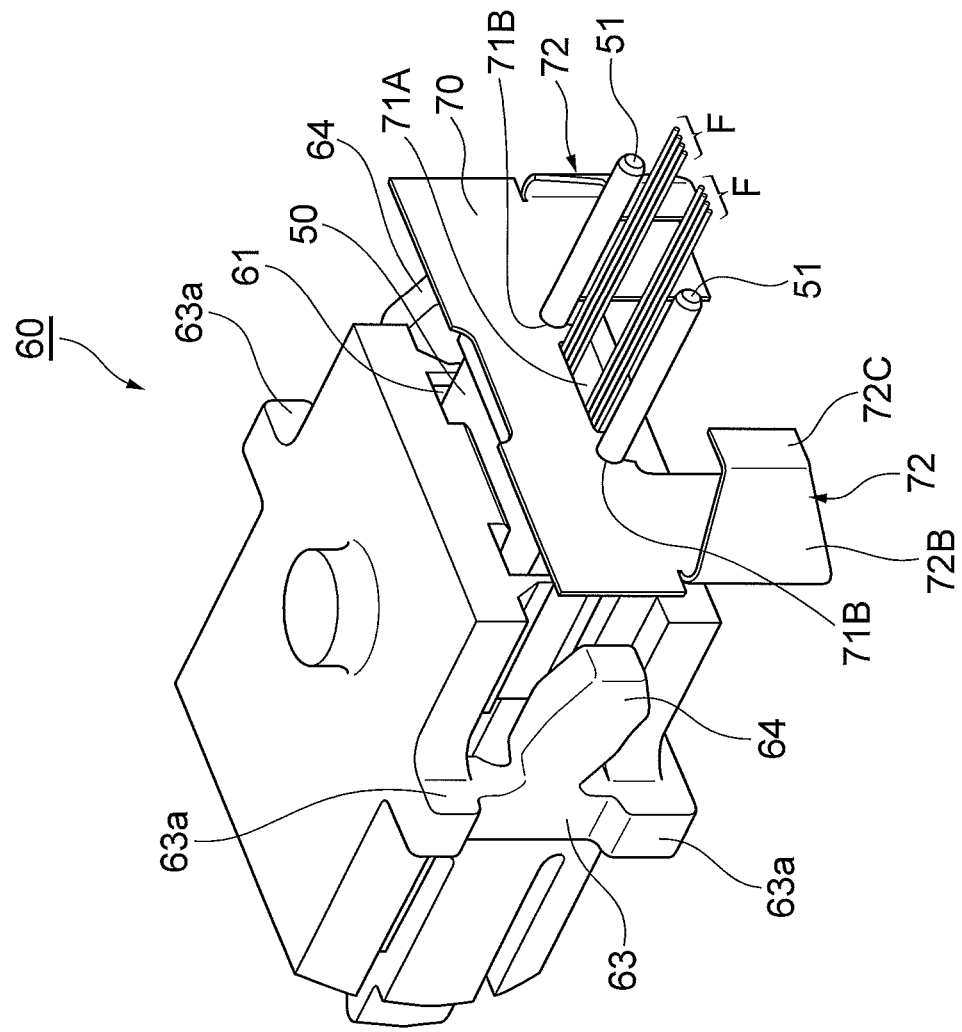
FIG. 7 is a perspective view of an optical receptacle where an MT ferrule therein is set therein.
Figure 8:
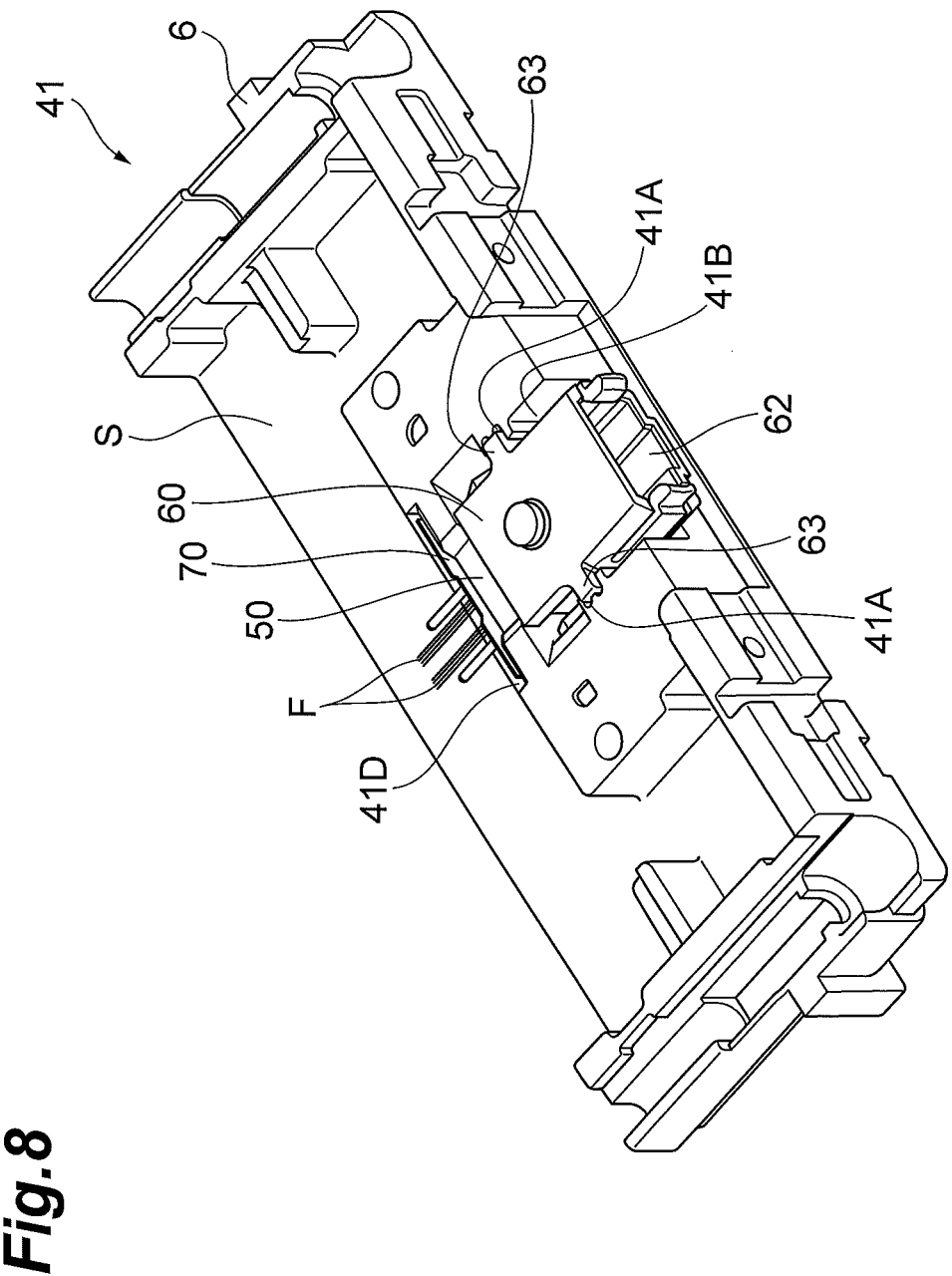
FIG. 8 shows an assembly including the optical receptacle with the MT ferrule, where the assembly is set in the preset position of the bottom body of the housing.
Figure 9:
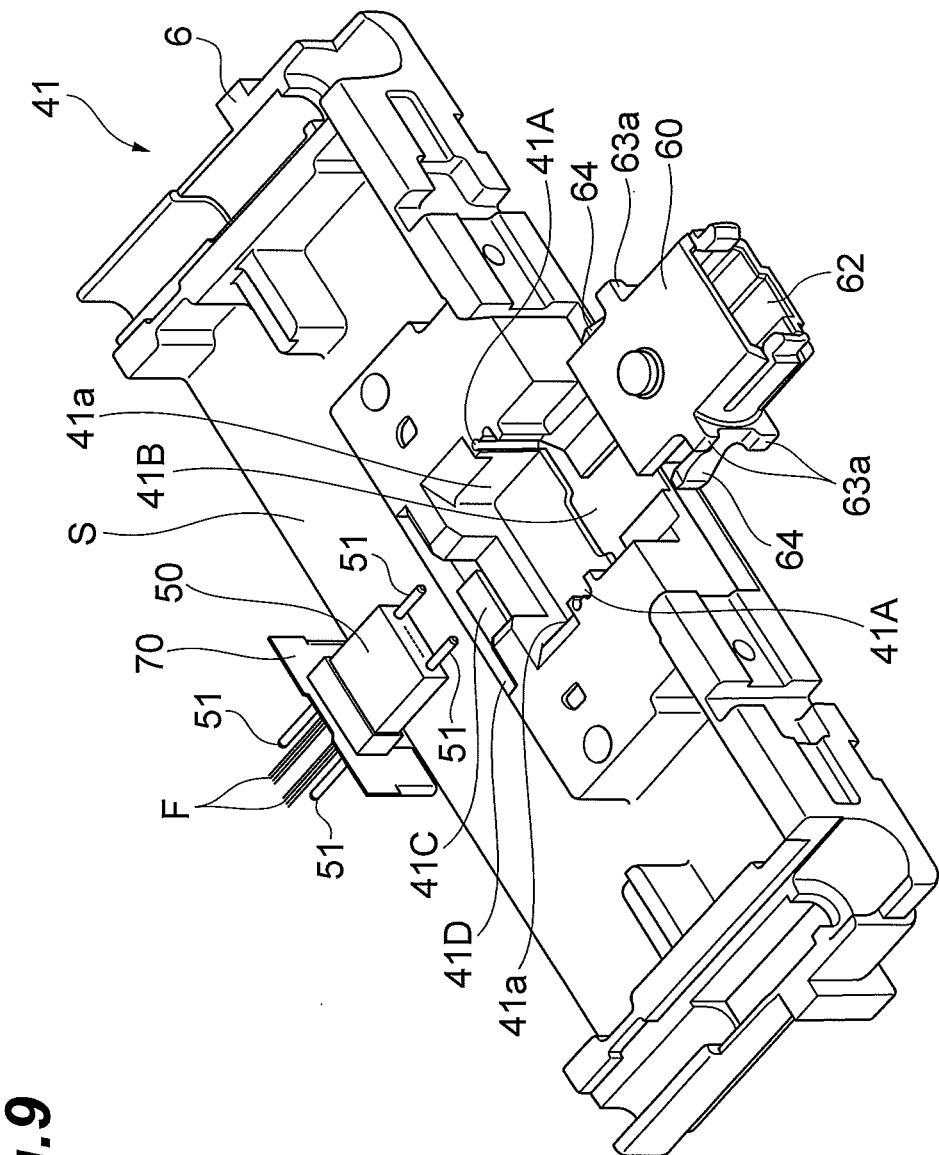
FIG. 9 is an exploded view of the bottom body of the housing, the optical receptacle, and the MT ferrule.

FIGS. 7 to 9 explain details of the optical receptacle 60 and structures of the bottom body 6 around the optical receptacle 60. The optical receptacle 60 provides a rectangular opening 61 in the rear thereof that receives an MT ferrule 50 secured in another end of the inner fibers F. While, the front of the optical receptacle 60 provides another opening 62 that receives the external MPO connector which is not explicitly illustrated in the figures. The shape of the front opening 62 traces the outer shape of the MPO connector. The MT ferrule 50 to be mated with the optical receptacle 60 secures a plurality of inner fibers F. Specifically, as shown in FIGS. 2 and 6, the present optical transceiver 1 provides three optical subassemblies each mounted on the sub-boards 11. Two of sub-assemblies output four optical beams and receive also four optical beams; while, the rest of sub-assemblies outputs two optical beams and receives two optical beams, where each of the optical beams is carried on an inner fiber F. That is, the optical transceiver 1 provides ten (10) inner fibers F for transmitting optical beams and other ten (10) inner fibers F for receiving optical beams. The MT ferrule 50 secures these twenty (20) inner fibers F and the inner fibers F are disposed in the fiber disposing region 31 and spaces provided in both sides of the optical receptacle 60 so as to secure the curvature greater than 15 mm.

Referring to FIG. 7 that shows the rear of the optical receptacle 60, the optical receptacle 60 provides in both sides thereof a flange 63 extending in substantially perpendicular to the optical axis of the optical receptacle 60. The flange 63 has two projections 63a in the top and the bottom thereof, that is, the optical receptacle 60 provides total four (4) projections 63a in respective sides thereof. These projections 63a are set in the guides 41A formed in the bottom body 6. Thus, the optical receptacle 60 is positioned with respect to the bottom body 6.

The flange 63 further provides, between up and bottom projections 63a, a tab 64 extending rearward and outward, which induces a repulsive force when the optical receptacle 60 is set in a space 41B by abutting against the side wall 41a surrounding the space 41B. Thus, the optical receptacle 60 is stably set within the space 41B even when the external MPO connector is set within the optical receptacle 60.

The MT ferrule 50, when it mates with the optical receptacle 60, abuts in rear surface thereof against the terrace 41C provided in the rear end of the space 41B to position of the optical receptacle 60 along the optical axis securely. That is, the terrace 41C assists to securely determine the optically reference surface, which is the front surface of the MT ferrule 50 with an enough accuracy.

Figure 10:
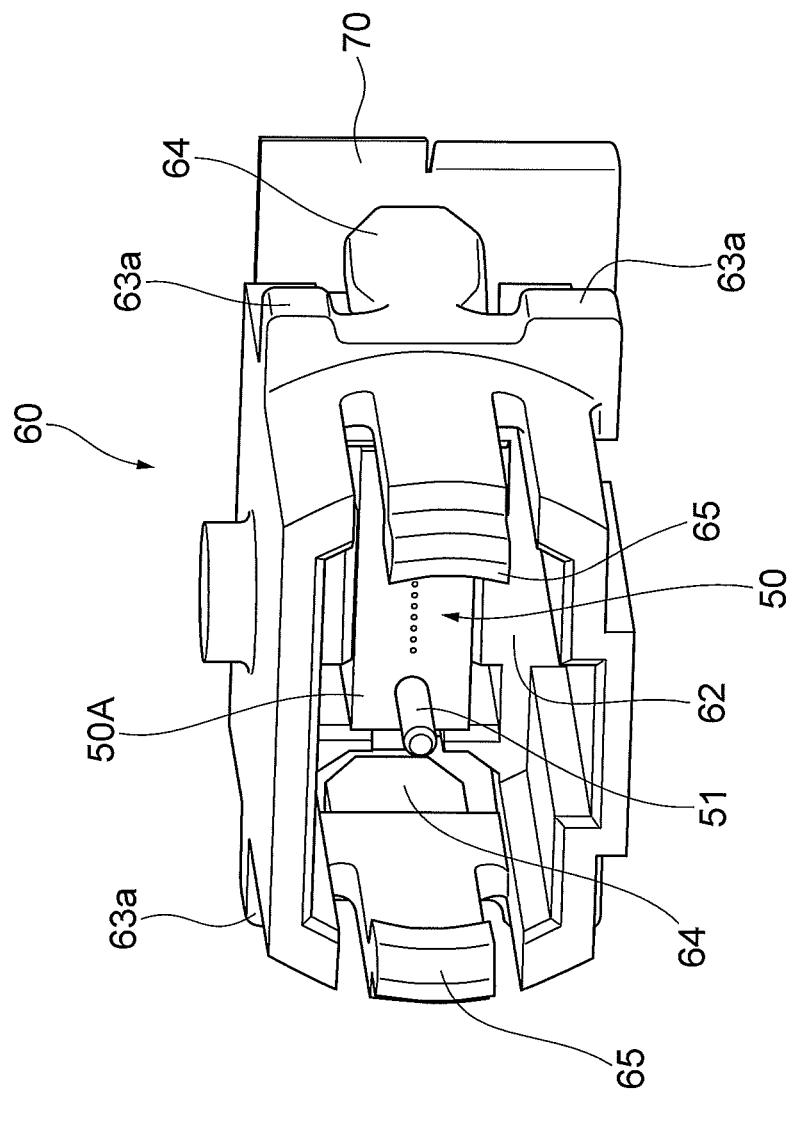
FIG. 10 shows the assembly of the optical receptacle and the MT ferrule, where the assembly is viewed from the front side of the optical transceiver.

As illustrated in FIGS. 9 and 10, the MT ferrule 50 provides guide pins 51 piercing the body thereof to mate and align optically with the external MPO connector. That is, the external MPO connector provides holes to receive the guide pins 51. Inserting the guide pins 51 into those holes in the MPO connector, the inner fibers F secured in the MT ferrule 50 and exposed in the surface of the MT ferrule 50 may optically couple with external fibers secured in the MPO connector. The front surface of the MT ferrule 50, at which the inner fibers F expose, becomes the optical reference plane. The guide pins 51 protruding rearward of the body of the MT ferrule 50 assists the positioning of the MT ferrule 50 in the space 41B. As described above, the MT ferrule 50 optically couples with the external MPO connector by setting the guide pins 51 into the holes of the MPO connector. Specifically, the MPO connector provides an MT ferrule therein with a female type, namely, having holes to receive guide pins. Inserting the MT ferrule 50 into the MPO connector, the guide pins 51 mate with the female holes in the other MT ferrule in the MPO connector and the optical fibers exposed in the front surface of the MT ferrule 50 may optically couple with the external fibers secured in and exposed at the surface of the other MT ferrule in the MPO connector. As described above, the MT ferrule 50 secures a plurality of fibers, 20 fibers are secured and expose at the surface of the MT ferrule 50 in the present embodiment. The other MT ferrule in the MPO connector also secures 20 external fibers. In order to couple these 20 fibers in the MT ferrule 50 stably with external fibers in the MPO connector, the front surface of the MT ferrule 50 and that of the external MT ferrule are necessary to be abutted evenly and homogeneously in the whole front surface. Accordingly, the MT ferrules are preferably to be elastically abutted.

Figure 11:
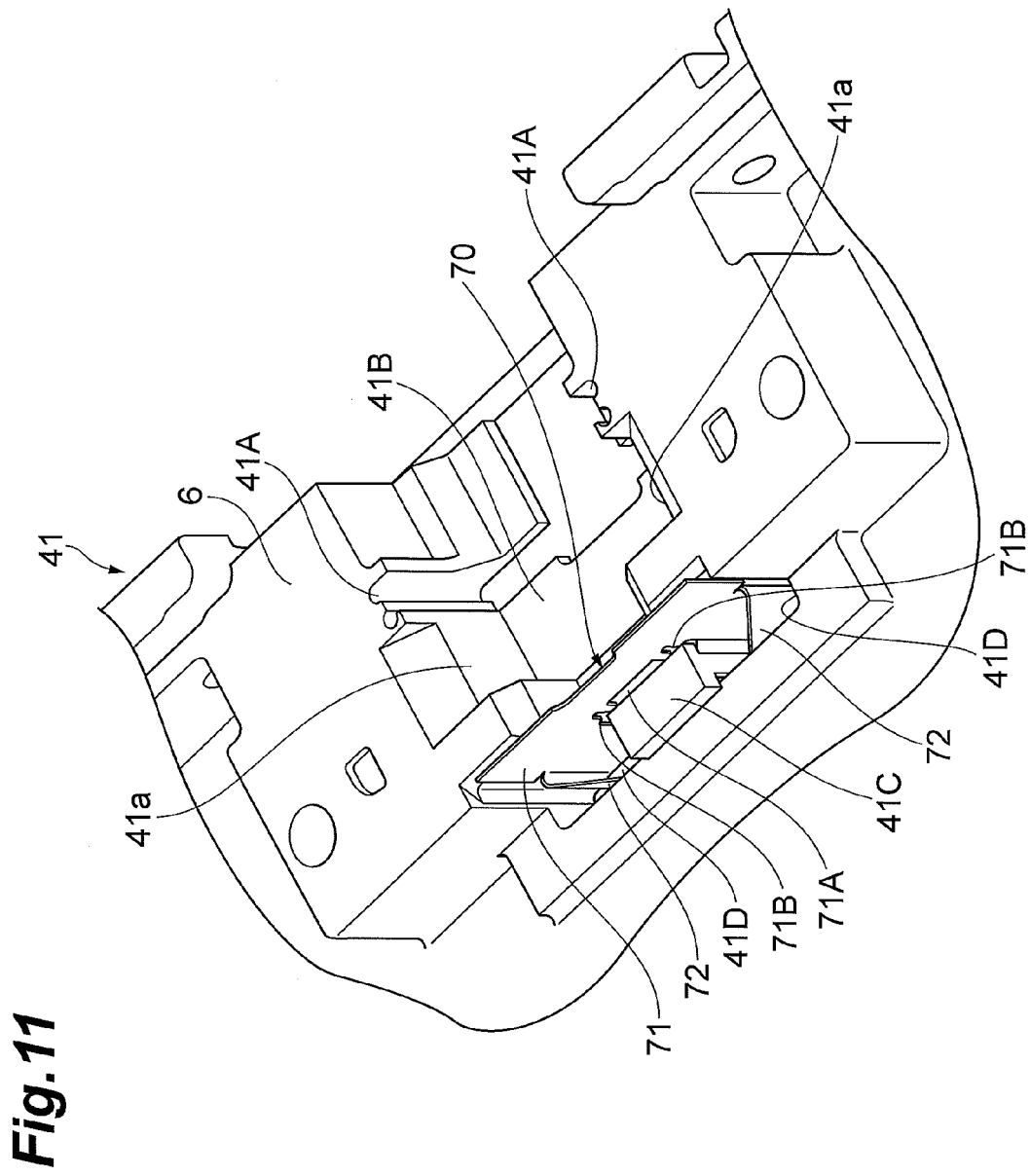
FIG. 11 is a perspective view showing a plate set within pockets provided in the housing.
Figure 12:
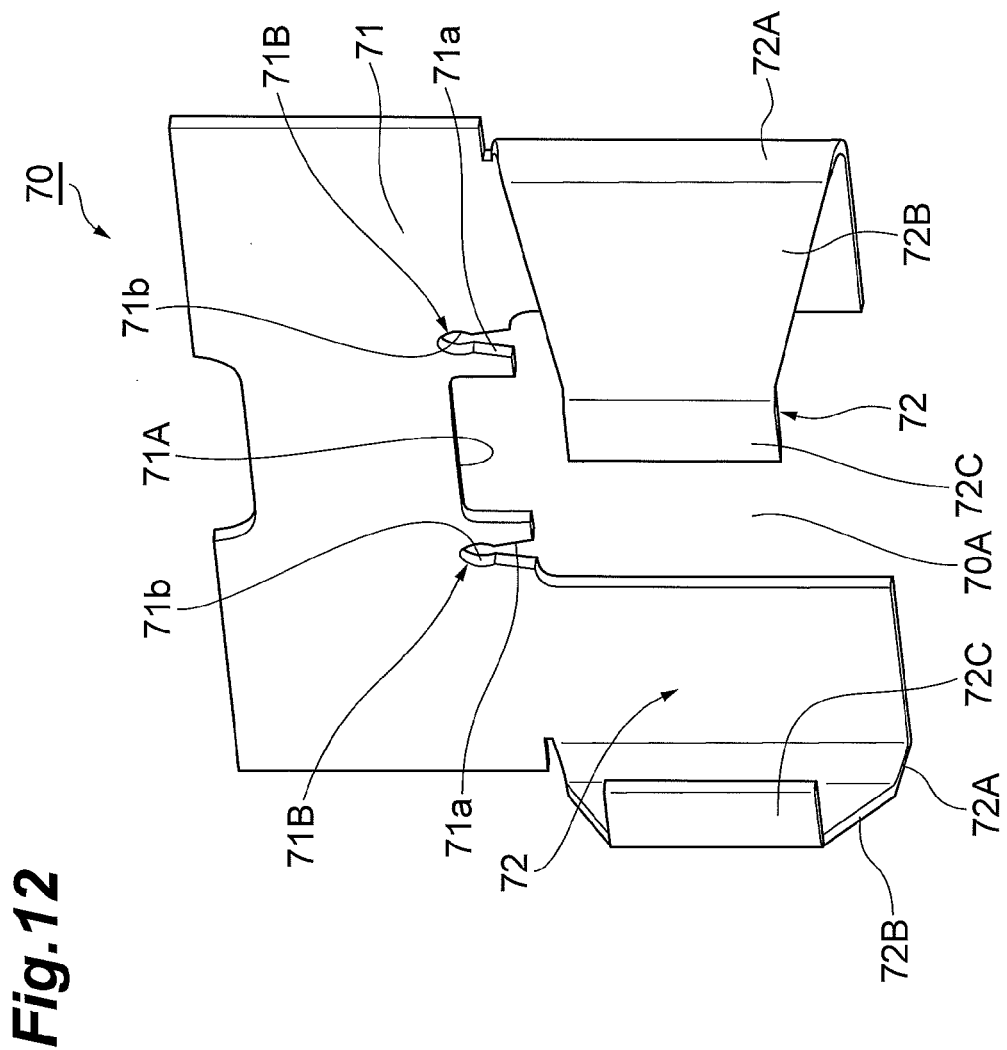
FIG. 12 is a perspective view of the plate shown in FIG. 11.

The optical transceiver 1 of the present embodiment provides a plate 70 not only to induce an elastic force against the MT ferrule 50 but to shield the inside of the optical transceiver 1 electrically. FIGS. 11 and 12 explain details of the plate 70 and structures around the plate 70 provided in the bottom body 6. Referring to FIG. 11, the plate 70 is set within the pocket 41D formed behind the space 41B for the optical receptacle 60. That is, the housing 2 provides two pockets 41D putting the terrace 41C therebetween. The plate 70 is set in the pockets 41D so as to stride over the terrace 41C. The plate 70 set in the pocket 41D is put between the rear surface of the MT ferrule 50 and the rear wall of the pocket 41D, by which the inside of the optical transceiver 1 where the optical and electrical devices are enclosed may be electrically isolated from the outside.

Referring to FIG. 12, the plate 70 includes a plane portion 71, and two legs 72 extending from the lower edge of the plane portion 71. These two legs 72 and the plane portion 71 forms a cut 70A between legs 72. The top edge of the cut 70A further provides a cut 71A to pass the inner fibers F and other cuts 71B in respective sides of the former cut 71A to pass the guide pin 51. The latter cut 71B has two portions, one of which 71a extends upwardly from the top edge of the cut 70A as narrowing a span thereof, and a circular opening 71b continuous from the former portion 71a. The root of the leg 72 and bent portions, 72A to 72C, form a U-shaped cross section. The circular portion 71b has a diameter slightly smaller than the diameter of the guide pin 51.

The legs 72 are bent three times. Specifically, the legs 72 are first bent rearward at the outer edge thereof to form the first portion 72A, bent inwardly to form the second portion 72B, and further bend inwardly to form the third portion 72C. The third portion 72C extends substantially in parallel to the plane portion 71. The height of the second portion 72B gradually decreases toward the third portion 72C, and the third portion 72C is substantially rectangular.

Thus, the plate 70, when it is set in the pocket 41D such that the plane portion 71 strides across the terrace 41C, the third portion 72C abuts against the rear wall of the pocket 41D, the plane portion 71 pushes the rear surface of the MT ferrule 50 frontward. Moreover, because the plate 70 is formed only by cutting and bending a metal sheet without using soldering, welding and so on, the plate 70 becomes a cost effective component.

Thus, the optical transceiver 1 of one of embodiments of the present application is described in detail. The optical transceiver 1 has a feature that it provides the plate 70 set in the rear end of the optical receptacle 60 to shield the space S and the inside where the optical and electrical devices are installed. The electro-magnetic interference EMI is effectively suppressed. Moreover, the plate 70 shows the repulsive force against the MT ferrule 50 set in the optical receptacle 60 when the plate 70 is set in the pocket 41D, which effectively abuts the front surface of the MT ferrule 50 against the front surface of the external MT ferrule secured in the MPO connector. Thus, the inner fibers F may be stably and evenly coupled with the external fibers.

The plate 70 provides the cut 71A to pass the inner fibers F therethrough, and other cuts 71B provided in respective sides of the former cut 71A to pass the guide pins 51 extending from the MT ferrule 50. These cuts, 71A and 71B, form openings combined with the terrace 41C provided in the rear of the pocket 41D. Moreover, the openings attributed to two cuts, 71A and 71B, have areas narrower as possible to enhance the EMI shielding.

Second Embodiment

Next, another optical transceiver 101 according to the second embodiment of the present application will be described as referring to FIGS. 13 and 14.

Figure 13:
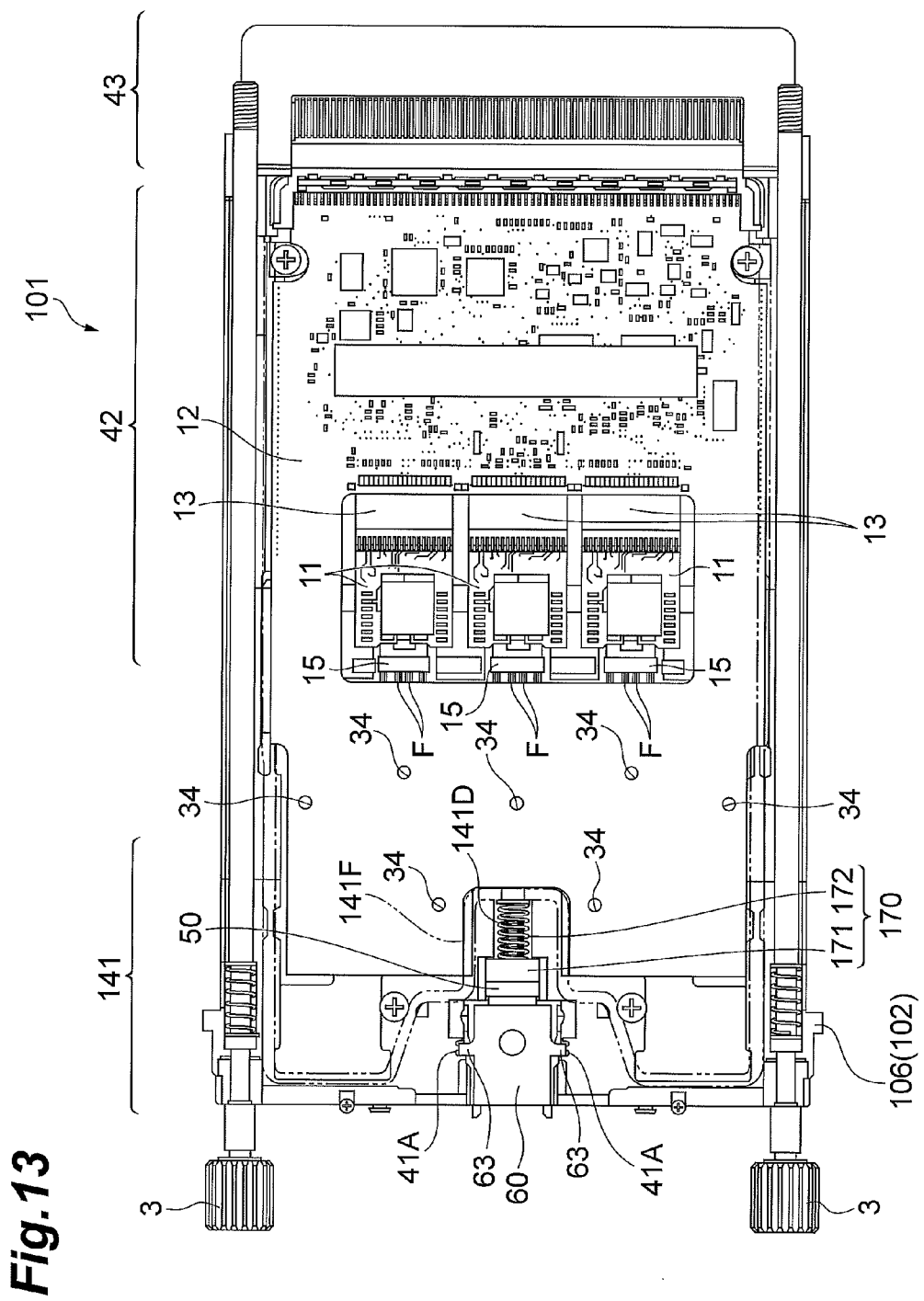
FIG. 13 is a plan view of the inside of the optical transceiver having a mechanism to push the MT ferrule frontward according to the second embodiment of the present application.

FIG. 13 is a plan view showing the inside of the optical transceiver 101 of the second embodiment. The optical transceiver 101 provides another bottom body 106 that includes a modified receptacle portion 141 with a mechanics 170 to push the MT ferrule 50 in the optical receptacle 60 instead of the plate 70 in the former embodiment. Other arrangements of the modified optical transceiver 101 are substantially same as those of former embodiment 1.

Figure 14:
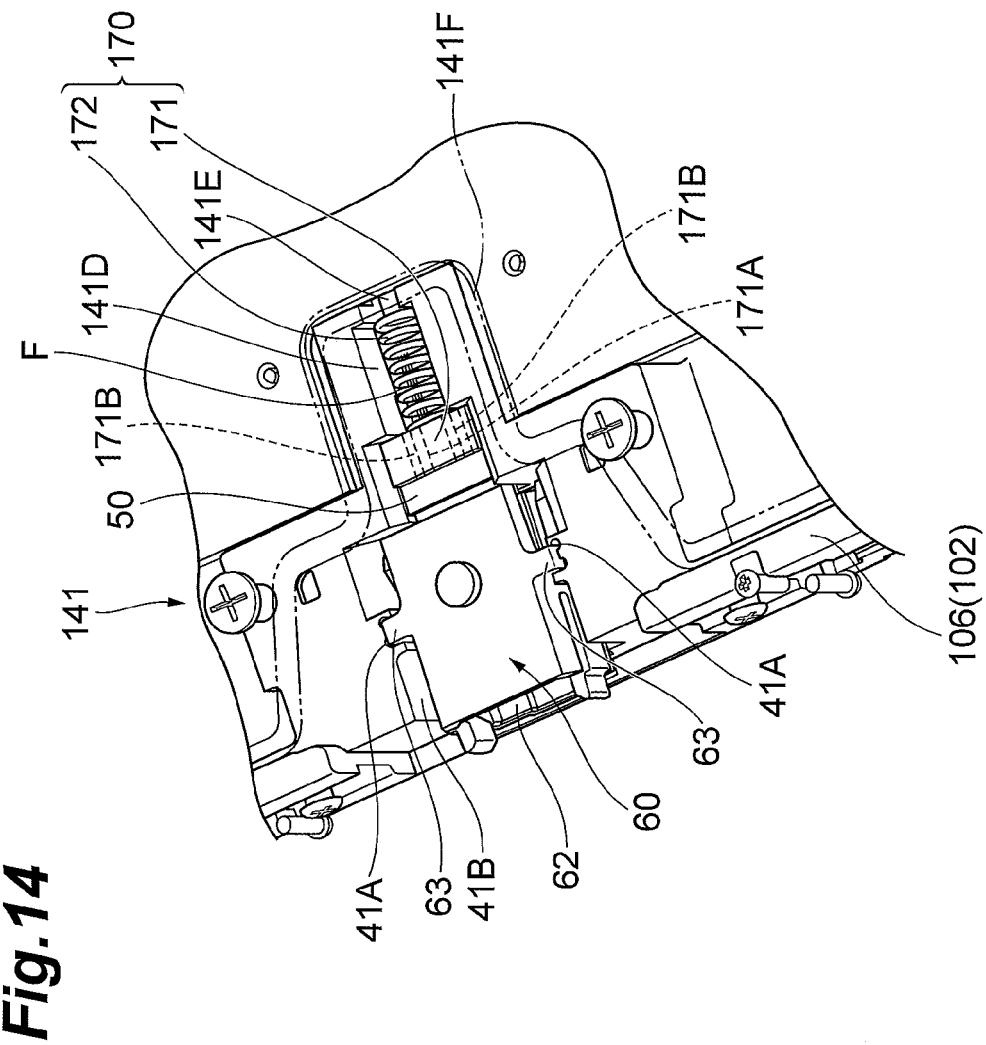
FIG. 14 magnifies the mechanism provided in the rear of the MT ferrule to push the MT ferrule frontward.

The receptacle portion 141 of the present embodiment shown in FIGS. 13 and 14, removes the terrace 41C. Instead of the terrace 41C, the receptacle portion 141 provides a hollow 141D to receive the mechanism 170 therein. The mechanism 170 includes a holder 171 with a rectangular shape to hold the MT ferrule 50 and a spring 172 to push the holder 171 against the MT ferrule 50. The holder 171, which covers the rear portion of the body of the MT ferrule 50, provides the first opening 171A to pass the inner fibers F therethrough and the second openings 171B to pass the guide pins 51 in respective sides of the former opening 171A.

The spring 172 is set in the hollow 141D in a state slightly offset from an equilibrium condition, namely, the spring 172 is set in a slightly compressed state. The inner fibers F extracting from the MT ferrule 50 pass the opening 171A of the holder 171, the spring 172, and the cut 141E provided in the rear wall of the hollow 141D to be drawn within the inner space of the optical transceiver 101. Because the elastic constant of the spring 172 is usually greater than that of the leaf spring of the legs 72, the spring 172 may give a greater force to push the MT ferrule 50 forward, which enhances the performance of the optical coupling between two front faces of the MT ferrules. The MPO connector set in the optical receptacle 60 has a spring therein to push the MT ferrule forwardly. The elastic member, 72 or 172, in the optical transceiver, 1 or 101, is necessary to counter the force caused by the MPO connector. The spring 172, namely, the coil spring may effectively meet the force induced by the MPO connector.

The MT ferrule 50, when it is held by the mechanism 170 and this mechanism 170 is set in the hollow 141D, is pushed forward to abut against the optical receptacle 60. The hollow 141D has a depth greater than the diameter of the spring 172, which effectively prevents the spring 172 from slipping out from the hollow 141D.

Referring to FIG. 14, the optical transceiver 101 of the present embodiment further provides a gasket 141F arranged around the hollow 141D. The gasket 141F, which is made of electrically conductive and elastic material such as conductive rubber, is arranged so as to trace the edges of the hollow 141D. Accordingly, the arrangement of the mechanism 170 with the gasket 141F not only makes the performance of the MPO connector, namely, the optical coupling between many fibers, but secures the electrical shielding function.

In the foregoing detailed description, the optical transceiver of the present application has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver, comprising:
an optical assembly including an optical device;
an optical receptacle coupled with an external fiber secured in a multiple-fiber push-on (MPO) connector by receiving the MPO connector therein;
an inner fiber coupled with the optical assembly by a mechanical transfer (MT) ferrule and with the optical receptacle by another MT ferrule;
a mechanism including an electrically conductive plate providing a plane portion and two legs forming a cut between legs, the plate pushing the another MT ferrule toward the optical receptacle and to shield an inside of the optical transceiver; and
a housing configured to install the optical assembly the optical receptacle, the inner fiber, and the mechanism therein, the housing being made of electrically conductive material,
wherein the housing provides two pockets and a terrace behind the optical receptacle, the legs of the mechanism being inserted into respective pockets such that the cut of the plate strides across the terrace.

2. The optical transceiver of claim 1,
wherein the inner fiber passes through a gap formed between the terrace and the plate.

3. The optical transceiver of claim 1,
wherein each of the legs of the plate is bent several times to form a U-shaped cross section to induce a repulsive force against another MT ferrule.

4. The optical transceiver of claim 3,
wherein the bent portion of the plate abuts against the rear wall of the pocket, and the plane portion pushes a rear surface of the another MT ferrule.

5. The optical transceiver of claim 1,
wherein the plate further provides a circular opening arranged in parallel with the cut, the opening passing a guide pin extending from the another MT ferrule.

6. The optical transceiver of claim 1,
wherein the mechanism includes a holder and a spring, the housing providing a hollow to set the mechanism therein,
wherein the holder holds the another MT ferrule, the spring being coupled with the holder and pushing the another MT ferrule against the optical receptacle.

7. The optical transceiver of claim 6,
wherein the spring is a coil spring, the inner fiber extracted from another MT ferrule passing inside the coil spring and a cut provided in the wall forming the hollow.

8. The optical transceiver of claim 1,
further including a number of optical assemblies,
wherein each of optical assemblies provides a plurality of optical devices, the MT ferrule, and a lens assembly configured to couple the optical devices with the MT ferrule collectively.

9. The optical transceiver of claim 8,
wherein another MT ferrule set in the optical receptacle secures a plurality of inner fibers whose total count is equal to the number of optical devices.

* * * * *